United States Patent
Sheikh et al.

(10) Patent No.: US 12,477,442 B2
(45) Date of Patent: Nov. 18, 2025

(54) MULTI-BAND MULTI-RAT CELL SEARCH

(71) Applicant: Apple Inc., Cupertino, CA (US)

(72) Inventors: Parvez Sheikh, Bengaluru (IN); Bernd H. Kemmer, Eichenau (DE); Prasad P. Ashtekar, Haar (DE); Saikat Sengupta, Bengaluru (IN)

(73) Assignee: Apple Inc., Cupertino, CA (US)

( * ) Notice: Subject to any disclaimer, the term of this patent is extended or adjusted under 35 U.S.C. 154(b) by 435 days.

(21) Appl. No.: 17/934,677

(22) Filed: Sep. 23, 2022

(65) Prior Publication Data

US 2023/0098894 A1 Mar. 30, 2023

(30) Foreign Application Priority Data

Sep. 24, 2021 (IN) ............................. 202141043423
Sep. 14, 2022 (IN) ............................. 202241052453

(51) Int. Cl.
*H04W 48/16* (2009.01)
*H04W 72/0453* (2023.01)
*H04W 84/04* (2009.01)

(52) U.S. Cl.
CPC ....... *H04W 48/16* (2013.01); *H04W 72/0453* (2013.01); *H04W 84/042* (2013.01)

(58) Field of Classification Search
CPC .................. H04W 72/0453; H04W 84/042; H04W 48/18
See application file for complete search history.

(56) References Cited

U.S. PATENT DOCUMENTS

| | | | |
|---|---|---|---|
| 2011/0195712 A1* | 8/2011 | Mucke | H04W 48/16 455/434 |
| 2015/0341846 A1 | 11/2015 | Shi et al. | |
| 2017/0094591 A1 | 3/2017 | Namboodiri et al. | |

FOREIGN PATENT DOCUMENTS

| | | |
|---|---|---|
| CN | 101584239 | 11/2009 |
| CN | 105101350 | 11/2015 |
| CN | 106332232 | 1/2017 |

* cited by examiner

*Primary Examiner* — Diane D Mizrahi
(74) *Attorney, Agent, or Firm* — Fay Kaplun & Marcin, LLP

(57) ABSTRACT

A user equipment (UE) configured to determine, for each radio access technology (RAT) of a plurality of RATs, a first list of bands on which a public land mobile network (PLMN) is expected to be deployed and a second list of bands including bands not included in the first list, wherein the first list is determined based on a region where the UE is currently located and PLMN deployment information, select a search pattern for performing a cell search based on a current UE scenario, perform a first phase of the cell search and when the first phase of the cell search is unsuccessful and no cell is selected, perform a second phase of the cell search by either scanning frequencies included in the second list of bands for the first priority RAT or scanning frequencies included in the first list of bands for a second priority RAT.

20 Claims, 8 Drawing Sheets

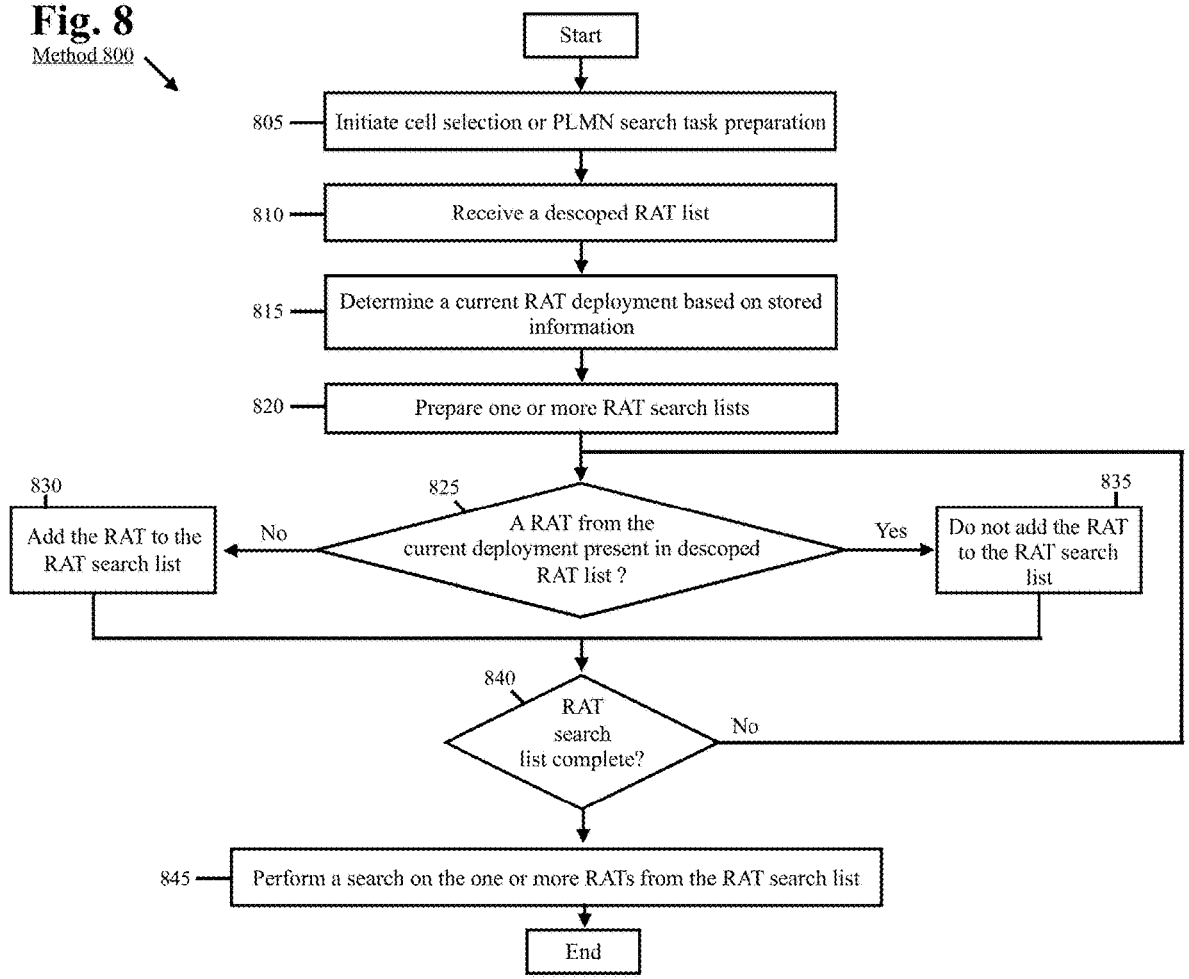

MULTI-BAND MULTI-RAT CELL SEARCH

PRIORITY CLAIM/INCORPORATION BY REFERENCE

This application claims priority to Indian Provisional Patent Application Serial No. 202141043423 filed Sep. 24, 2021, entitled, "Multi-Band Multi-RAT Cell Search," and Indian Provisional Patent Application Serial No. 202241052453 filed Sep. 14, 2022, entitled, "Multi-Band Multi-RAT Cell Search," both of which are incorporated herein by reference.

BACKGROUND INFORMATION

A user equipment (UE) may establish a connection to at least one of a plurality of different networks or types of networks. Some UEs may support operations over multiple different radio access technologies (RATs), for example RATs including 5G New Radio (NR), Long Term Evolution (LTE), Universal Mobile Telecommunications System (UMTS) and/or Global System for Mobile Communications (GSM). Each of these RATs are deployed across multiple frequency bands, wherein the bands used by the UE for network operations may vary depending on UE capability, the public land mobile network (PLMN) deploying the RATs, and/or the country/region of operation.

To access a PLMN, a UE performs a cell search to determine which frequency band and network cell to attempt to camp on. The UE may first perform a stored information cell selection where the UE scans the channels from a list of known frequency bands where the PLMN was previously found during the lifetime of the UE. If a cell is not found during the stored information cell selection, then the UE may next perform a specific band search where the UE scans all possible bands that the UE supports in the current country/region on a per-RAT basis. When the UE is capable of operations on multiple different bands over multiple RATs, the specific band search may require a large amount of time and energy consumption for the UE.

An operator may abandon deployments of older RATs (e.g., UMTS, GSM, LTE, etc.). The frequency bands previously used by an abandoned RAT may remain empty or may be reused by a newer RAT (e.g., NR, LTE, etc.). A scenario may occur where the stored information that may be used by the UE to perform a cell search does not reflect the RATs actually deployed by the operator. Utilizing out of date information that does not accurately reflect the actual deployment of RATs by the operator may have a negative impact on UE cell search performance.

SUMMARY

Some exemplary embodiments are related to a processor of a user equipment (UE) configured to perform operations. The operations include determining, for each radio access technology (RAT) of a plurality of RATs supported by the UE, a first list of bands on which a public land mobile network (PLMN) is expected to be deployed and a second list of bands including bands not included in the first list, wherein the first list of bands is determined based on a region where the UE is currently located and PLMN deployment information provided to the UE, wherein the second list of bands is determined based on the region where the UE is currently located, selecting a search pattern for performing a cell search based on a current UE scenario, performing a first phase of the cell search by scanning frequencies included in the first list of bands for a first priority RAT and when the first phase of the cell search is unsuccessful and no cell is selected, performing a second phase of the cell search by either scanning frequencies included in the second list of bands for the first priority RAT or scanning frequencies included in the first list of bands for a second priority RAT, wherein the second phase of the cell search is determined based on the selected search pattern.

Other exemplary embodiments are related to a processor of a user equipment (UE) configured to perform operations. The operations include generating a radio access technology (RAT) search list based on a descoped RAT list and performing an out of service recovery using the RAT search list.

Still further exemplary embodiments are related to a processor of a user equipment (UE) configured to perform operations. The operations include generating a bands to search list based on stored information comprising at least one of predefined band information per public land mobile network (PLMN), predefined band information per mobile country code (MCC) and frequency bands frequently detected by the UE, removing descoped frequency bands from the bands to search list and performing a band scan using the bands to search list.

BRIEF DESCRIPTION OF THE DRAWINGS

FIG. 8 shows a method for descoped RAT search avoidance according to various exemplary embodiments.

DETAILED DESCRIPTION

Figure 1:
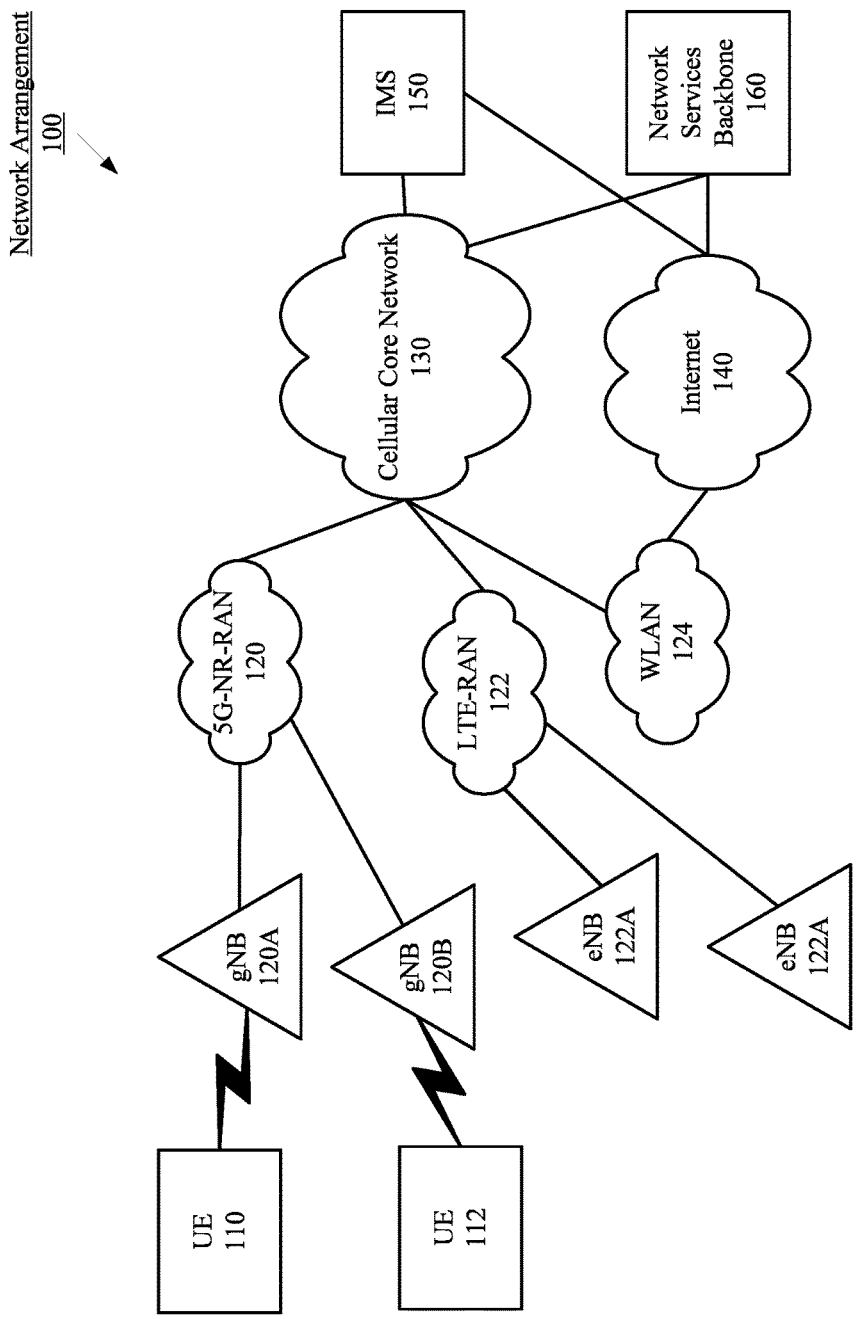
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a cell search for a user equipment (UE). Some of the exemplary embodiments introduce different search patterns that may be used depending on deployment information stored at the UE and/or based on a current use case scenario for the UE. Other exemplary embodiments introduce techniques for descoped radio access technology (RAT) and frequency band scanning avoidance during a cell search.

According to one aspect described herein, a specific band search (SBS) is split into two phases, wherein the first phase (SBS1) prioritizes frequency bands on which a public land mobile network (PLMN) is expected to operate in a particular country or region of operation, and the second phase (SBS2) searches the remaining frequency bands deployed in the country/region that were not searched in the first phase. Each of the two phases of the SBS may be performed for each radio access technology (RAT) supported by the UE, or only the first phase of the SBS (SBS1) may be performed for each of the RATs, to be explained in detail below.

According to another aspect, the UE selects a search pattern to use based on an evaluation of a current UE scenario. In a first search pattern, the UE performs both phases of the SBS (SBS1 followed by SBS2) for a particular RAT (e.g., RAT-A) before proceeding to perform both phases of the SBS for any further supported RATs (e.g., RAT-B, RAT-C), in some order of priority for the RATs. In a second search pattern, the UE performs the first phase of the SBS for each supported RAT before proceeding to perform the second phase of the SBS for the supported RATs. In a third search pattern, the UE performs only the first phase of the SBS for each supported RAT and does not perform the second phase of the SBS.

The SBS search pattern selected for use by the UE may vary based on a current UE scenario. For example, the first pattern may be used in emergency call scenarios, where the priority is to find the emergency call service on any RAT, regardless of PLMN. The second pattern may be used as a default option. The third pattern may be used in various cell recovery procedures when only a particular PLMN (e.g., a home PLMN) is desired for selection. These scenarios and additional scenarios, as well as various conditions that may precede the use of a particular SBS search pattern, will be described in detail below.

The exemplary embodiments are described with regard to operations performed by a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component that is capable of performing a cell search.

Certain aspects of the exemplary embodiments are described with regard to a 5G New Radio (NR) network. However, reference to a 5G NR network is merely provided for illustrative purposes. As will be explained in further detail below, the exemplary embodiments are related to a UE performing a cell search across various radio access technologies (RATs), including e.g., 5G New Radio (NR), Long Term Evolution (LTE), Universal Mobile Telecommunications System (UMTS), Global System for Mobile Communications (GSM) and/or other networks. Therefore, the networks described herein may represent any network that utilizes initial access signaling and may be searched by the UE in a similar manner as described herein.

According to some aspects, the exemplary embodiments introduce techniques for descoped RAT and frequency band scanning avoidance during a cell search. The UE may perform a cell search based on stored information such as, but not limited to, a preconfigured list of frequency bands per RAT and information identifying RATs and frequency bands previously detected by the UE. However, for any of a variety of different reasons, an operator may stop deploying a certain RAT or frequency band. As a result, a scenario may occur where the UE is configured to rely on stored information to perform a cell search that is out of data and does not accurately reflect the actual deployment of RATs and/or frequency bands by the operator. This may have a negative impact on UE cell search performance. The exemplary techniques introduced herein allow the UE to avoid wasting time and power searching for cells of descoped RATs and/or frequency bands that are no longer deployed by the operator.

The exemplary techniques may be used independently from one another, in conjunction with currently implemented cell search mechanisms, future implementations of cell search mechanisms or independently from other cell search mechanisms.

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g., legacy cellular networks) and the UEs 110, 112 may also communicate with networks over a wired connection. With regard to the exemplary embodiments, the UEs 110, 112 may establish a connection with the 5G NR-RAN 120, the LTE-RAN 122, legacy networks including UMTS and GSM, or other networks.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B.

The gNBs 120A, 120B may represent cells providing services as a PCell or an SCell, or in a standalone configuration with the UE 110. The gNBs 120A, 120B may represent any access node of the 5G NR network through which the UEs 110, 112 may establish a connection and manage network operations. The gNBs 120A, 120B may include a processor, a memory arrangement, an input/output (I/O) device, a transceiver, and other components. The other components may include, for example, an audio input device, an audio output device, a battery, a data acquisition device, ports to electrically connect the gNB 120A to other electronic devices, etc.

The processor may be configured to execute a plurality of engines of the gNB 120A. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor is split among a plurality of processors (e.g., a baseband processor, an applications processor, etc.). The exemplary embodiments may be implemented in any of these or other configurations of a gNB.

The memory may be a hardware component configured to store data related to operations performed by the UEs 110, 112. The I/O device may be a hardware component or ports that enable a user to interact with the gNB 120A. The transceiver may be a hardware component configured to exchange data with the UEs 110, 112 and any other UE in the system 100. The transceiver may operate on a variety of different frequencies or channels (e.g., set of consecutive frequencies). For example, the transceiver may operate on unlicensed bandwidths when NR-U functionality is configured. Therefore, the transceiver may include one or more components (e.g., radios) to enable the data exchange with the various networks and UEs.

The eNBs 122A, 122B may be configured for LTE operations similarly to the gNBs 120A, 120B described above for NR operations. Additionally, in the exemplary embodiments described herein, the UEs 110, 112 may perform operations with network cells configured for UMTS and/or GSM operations. In some PLMNs, the same network cell may be capable of operations on a plurality of different RATs. Thus, the gNBs 120A, 120B and eNBs 122A, 122B are shown for exemplary purposes only, and the UEs 110, 112 may connect to any type of network.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g., the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
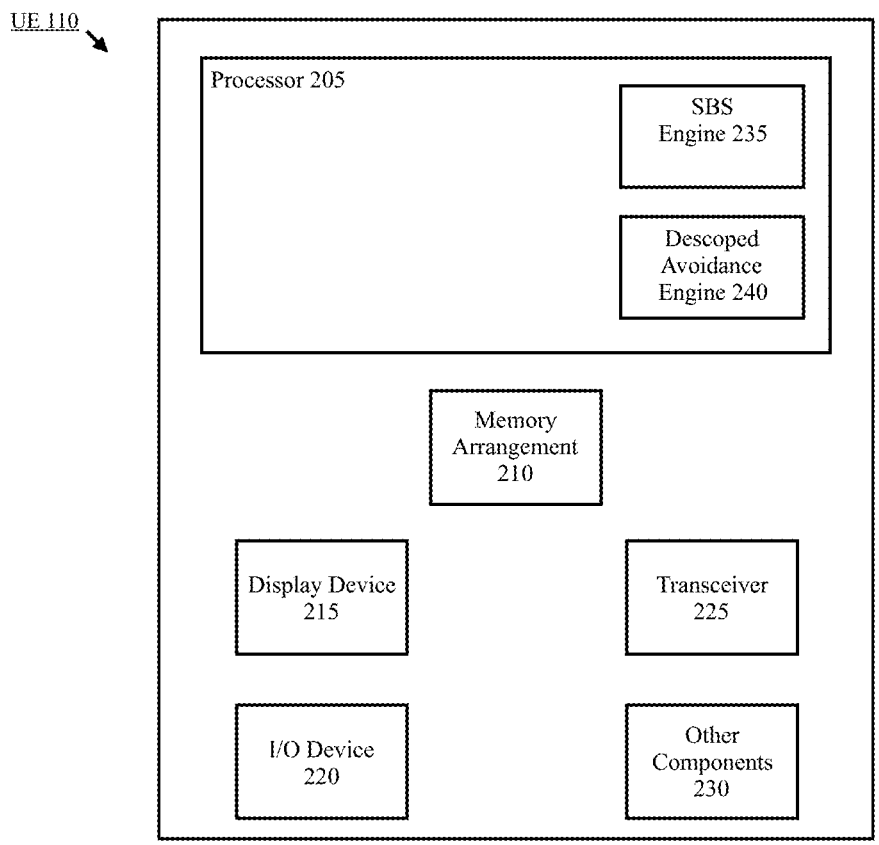
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a specific band search (SBS) engine 235 and a descoped avoidance engine 240. The SBS engine 235 may perform operations including, but not limited to, determining a list of frequencies to search in each phase of a two-phase SBS search, determining a search pattern to use based on a current UE scenario, performing the SBS in accordance with the selected search pattern, and other operations to be described in further detail below. The descoped avoidance engine 240 may perform operations including, but not limited to, identifying a descoped RAT, identifying a descoped frequency band and omitting the identified descoped RATs and/or frequency bands from different aspects of cell selection procedures.

The above referenced engines being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g., NR-U is configured.

The 5G NR initial access procedure generally comprises the following operations. However, it should be understood that the exemplary embodiments are not limited to any particular access procedure or order of the operations. The following is provided as an example to illustrate a procedure wherein the UE performs a cell search, particularly with reference to the 5G NR RAT. However, the UE may perform a cell search at other times and with other RATs, to be explained below, and the exemplary embodiments are not limited to this particular procedure or RAT. For example, the UE may perform a cell search to camp on a cell irrespective of its PLMN identity so that emergency calls can be made. In another example, the UE may prioritize a cell search for a different RAT prior to performing a cell search on NR frequencies.

In 5G NR initial access, a gNB periodically broadcasts system information (SI), which may be categorized as minimum system information (MSI) and other system information (OSI), using beam sweeping. Beam sweeping generally refers to the transmission of a plurality of transmitter beams over a particular spatial area during a predetermined duration. Each beam transmitted during a transmitter beam sweep may include a reference signal. A UE may measure one or more of the transmitter beams based on their respective reference signals and select one of the transmitter beams based on the measurement data.

A synchronization signal block (SSB) broadcast by the gNB comprises synchronization signals (SS) (a primary synchronization signal (PSS) and a secondary synchronization signal (SSS)) and a physical broadcast channel (PBCH), wherein the PBCH transmission includes a master information block (MIB) containing MSI. The MSI includes parameters indicating the location and resources for ControlResourceSet0 (CORESET#0) on the resource grid, which carries the downlink control information (DCI) used to decode system information block 1 (SIB1). SIB1 may be referred to as remaining minimum system information (RMSI), a subset of MSI, and is carried on the Physical Downlink Shared Channel (PDSCH). The SSB (including the MIB) and the CORESET#0/RMSI (SIB1) are transmitted on a same beam, which, when selected by the UE, will be used by the UE for random access channel (RACH) transmissions until a dedicated connection is established and the beam is switched. OSI includes SIB2 to SIB9, which may be broadcast or provisioned for the UE via dedicated RRC signaling.

The UE performs the beam measurements, detects the best SSB (e.g., the strongest beam) and selects this beam. The UE then decodes the SSB and, based on the extracted MSI parameters, searches the Type 0-PDCCH common search space (CSS) for downlink control information (DCI) on the CORESET#0, which is then used to decode SIB1. The extracted SI allows the UE to use the same beam to initiate the random access (RACH procedure) by transmitting Msg1 of the RACH procedure, i.e., the RACH preamble, on the physical random access channel (PRACH).

A cell search refers to the procedure where a UE attempts to detect and decode a broadcast (e.g., SSB) from a network cell to obtain the parameters for accessing the cell. The cell search may be performed during both cell selection and PLMN search. In a first step of the cell search, the UE performs a frequency scan. The frequency scan comprises the UE tuning to each channel in a list of supported channels and measuring the strength of a signal detected on that frequency, e.g., the reference signal strength indicator (RSSI) for each of the scanned channels. In this step, only the strength of signal (e.g., RSSI) is measured, i.e., no channel decoding is performed at this stage. After the scan, the UE determines a sub-list of candidate channels where the signal strength is higher than a threshold. This threshold value, e.g., RSSI threshold, may depend on UE implementation.

After determining this sub-list of candidate channels, the UE attempts to decode the PSS and SSS on each candidate frequency, which will allow the UE to acquire frequency and time synchronization and detect the physical cell ID for the network cell. The UE may then select a cell and/or beam and decode the PBCH MIB and the RMSI to extract the PLMN ID, cell selection parameters and RACH parameters. When the extracted PLMN ID matches a PLMN ID from a list of PLMNs available to the UE, the UE performs a cell selection procedure. Otherwise, the UE acquires another cell and restarts the process.

The list of bands/channels scanned by the UE in the cell search may depend on the type of frequency scan being performed. The types of frequency scans include a stored information cell selection (SICS), where the UE scans the channels within a stored list of frequencies and/or frequency bands where the PLMN was previously found during the lifetime of the UE. The SICS may be performed for each of the RATs supported by the UE, in some priority order determined based on UE implementation. For example, the UE may prioritize the RAT that was most recently camped on. In another example, the UE may prioritize the RATs in an order, e.g., NR, LTE, UMTS and GSM. However, other priority orders may be used.

A second type of frequency scan is a specific band search (SBS), where the UE scans bands that the UE supports in the country/region where the UE is currently located. A third type of frequency scan is an additional band search (ABS), where the UE scans all remaining bands not covered by the SBS, including bands not deployed in the country/region where the UE is currently located. The SBS and the ABS may also be performed for multiple RATs in continuity based on the priority order for the supported RATs.

Some UEs may support network operations for multiple different radio access technologies (RATs) and types of networks, e.g., NR, LTE, UMTS and GSM. Each of these RATs may support multiple bands, which may vary based on the operator (PLMN) and the region. For example, 57 different bands may be supported on NR FR1, 6 different bands may be supported on NR FR2, 88 different bands may be supported on LTE, 21 different bands may be supported on UMTS, and 5 different bands may be supported on GSM. Within each band, multiple channels may be used. Throughout the world, different RATs are deployed across multiple bands on a per RAT basis, which may vary on the basis of country and region, thus leading to a large spectrum of bands that can be used for network operations with a UE.

According to various exemplary embodiments described herein, a cell search for a UE includes a specific band search (SBS) that is divided into two phases. In the first phase of the SBS (SBS1), the UE searches only on specific bands on which the operator/PLMN has been deployed or is expected to be deployed in the location/region/country where the UE is currently located. The UE determines this first list of bands based on deployment information for the PLMN. This information may be derived in different ways, including but not limited to i) based on historical data determined by the UE regarding where the PLMN was previously found, ii) using location-based PLMN deployment data, or iii) using static/dynamic configuration data of the PLMN and its band deployment stored in the UE.

In a second phase of the SBS (SBS2), the UE searches the remainder of the bands that are deployed in the current location/region/country and which have not yet been searched in the first SBS step. Thus, a second list of bands is determined based in part on known operating frequency bands used in the region. The information for the deployed bands for the country may be derived in different ways including but not limited to using static/dynamic configuration data stored in the UE of band deployment per county basis.

According to further exemplary embodiments described herein, a cell selection and search method for a UE is described wherein the UE decides among various search options using the two-phase SBS framework described above.

In the following options, a particular search (SICS, SBS1, SBS2) is described as being performed on a particular RAT (RAT-A, RAT-B, RAT-C, RAT-D). As detailed above, each of these searches includes a scanning of all frequencies on a list, and a generation of a sub-list including frequencies where a received signal strength indication (RSSI) is above some threshold. After the generation of the sub-list, the UE may attempt to camp to a selected frequency. If the particular search is unsuccessful, then the UE proceeds to a next search based on predefined rules and/or a selected search pattern, as will be described in detail below.

In a first search pattern, the UE performs both steps of the SBS for every supported RAT on a per-RAT basis. Each RAT is searched in order of priority, wherein the first phase of the SBS is performed by the UE for a first RAT and the second phase of the SBS is performed by the UE for the same RAT before proceeding to a next RAT. The first search pattern may be considered a default option where the UE searches the deployed bands in the country on a per-RAT basis in continuity. In this option, the optimization of the SBS search may be limited relative to the second and third search patterns discussed below.

Figure 3:
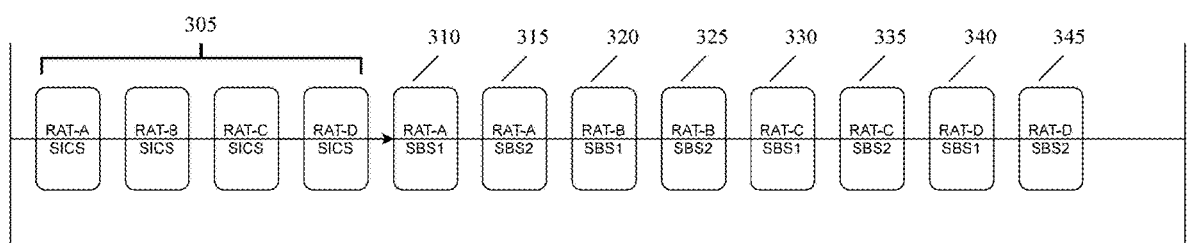
FIG. 3 shows an exemplary diagram for a UE cell search according to a first search pattern.

FIG. 3 shows an exemplary diagram 300 for a UE cell search according to a first search pattern. The diagram 300 is described with respect to four RATs, i.e., RAT-A, RAT-B, RAT-C and RAT-D. In the exemplary diagram 300, RAT-A corresponds to NR, RAT-B corresponds to LTE, RAT-C corresponds to UMTS and RAT-D corresponds to GSM. However, a different number of RATs and/or a different order of priority may be used depending on UE implementation.

In 305, the UE performs a SICS on the available RATs in continuity based on the order of priority. The UE first searches stored bands on RAT-A, e.g., scans frequencies on the list for the RAT-A SICS, and attempts to camp on a frequency/cell and perform an initial access procedure to register with the network. If the cell selection process fails for all the listed frequencies on RAT-A, or if no cells are found meeting the signal strength threshold, the UE proceeds to RAT-B, RAT-C, and RAT-D in continuity and performs the same process of scanning and attempting to camp on a frequency/cell for the respective RATs.

When no cell is accessed in 305, the UE proceeds to 310. In 310, the UE performs the first phase of the SBS (SBS1) for RAT-A. As discussed above, in the SBS1, the UE searches bands where the band is known to be deployed or expected to be deployed in the current location by the PLMN being searched.

When no cell is accessed in 310, the UE proceeds to 315. In 315, the UE performs the second phase of the SBS (SBS2) for RAT-A. The UE searches all bands deployed in the country/region that were not searched in SBS1 for RAT-A in 310.

When no cell is accessed in 315, the UE continues to search the remaining RATs. That is, the UE proceeds to perform the first phase of the SBS for RAT-B (step 320), the second phase of the SBS for RAT-B (step 325), the first phase of the SBS for RAT-C (step 330), the second phase of the SBS for RAT-C (step 335), the first phase of the SBS for RAT-D (step 340), and the second phase of the SBS for RAT-D (step 345).

The first cell search pattern, as exemplified in the diagram 300, may be used primarily in scenarios where the UE does not know of the deployment of the PLMN. Therefore, the UE may not yet have a list of stored bands for the PLMN to be used for the SBS1, in which case the SBS1 is not performed and the search begins with the SBS2. Therefore, in these scenarios, the progression of the search may be similar to legacy SBS, i.e., where the UE searched all bands for the country without any prior knowledge of the deployment of the PLMN.

In a second cell search pattern, the UE performs the first step of the SBS for every supported RAT on a per-RAT basis prior to performing the second step of the SBS for any of the RATs. Each RAT is searched in order of priority, wherein the first phase of the SBS is performed by the UE for RAT-A, RAT-B, RAT-C and RAT-D, and then the second phase of the SBS is performed by the UE for RAT-A, RAT-B, RAT-C and RAT-D.

Figure 4:
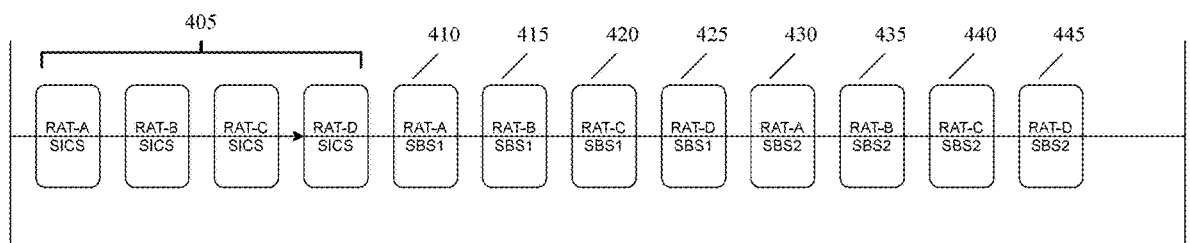
FIG. 4 shows an exemplary diagram for a UE cell search according to a second search pattern.

FIG. 4 shows an exemplary diagram 400 for a UE cell search according to a second search pattern. The diagram 400 is described with respect to four RATs, i.e., RAT-A, RAT-B, RAT-C and RAT-D, similar to the diagram 300 described above, wherein RAT-A corresponds to NR, RAT-B corresponds to LTE, RAT-C corresponds to UMTS and RAT-D corresponds to GSM. However, a different number of RATs and/or a different order of priority may be used depending on UE implementation.

In 405, the UE performs a SICS on the available RATs in continuity based on the order of priority, similar to 405. The UE first searches stored bands on RAT-A, e.g., scans frequencies on the list for the RAT-A SICS, and attempts to camp on a frequency/cell and perform an initial access procedure. If the cell selection process fails for all the listed frequencies on RAT-A, or if no cells are found meeting the signal strength threshold, the UE proceeds to RAT-B, RAT-C, and RAT-D in continuity and performs the same process of scanning and attempting to camp on a frequency/cell for the respective RATs.

When no cell is accessed in 405, the UE proceeds to 410. In 410, the UE performs the first phase of the SBS (SBS1) for RAT-A, similar to 310. As discussed above, the UE searches bands on RAT-A where the band is known to be deployed or expected to be deployed in the current location by the PLMN being searched.

When no cell is accessed in 410, the UE continues to the remaining RATs to perform SBS1. That is, the UE proceeds to perform SBS1 for RAT-B (step 415), RAT-C (step 420) and RAT-D (step 425).

When no cell is accessed in 415-425, the UE proceeds to 430. In 430, the UE performs the second phase of the SBS (SBS2) for RAT-A. As discussed above, the UE searches all bands deployed in the country/region that were not searched in SBS1 for RAT-A in 410.

When no cell is accessed in 430, the UE continues to the remaining RATs to perform SBS2. That is, the UE proceeds to perform SBS2 for RAT-B (step 435), RAT-C (step 440) and RAT-D (step 445).

In a third cell search pattern, the UE performs the first phase of the SBS for every supported RAT on a per-RAT basis and does not perform the second phase of the SBS. Therefore, the third cell search pattern is similar to the second cell search pattern, but includes only SBS1.

Figure 5:
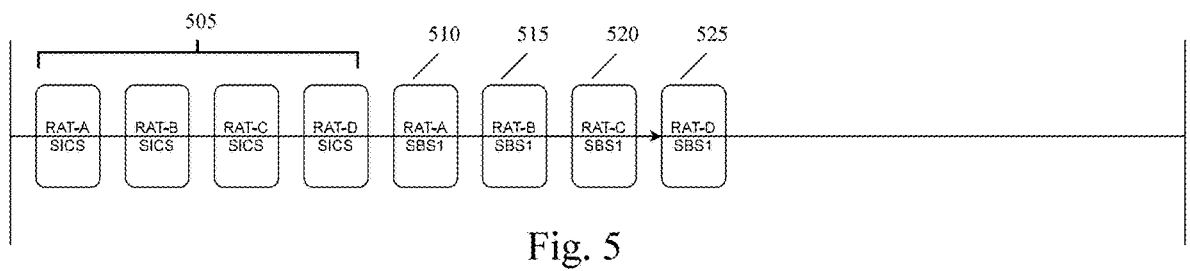
FIG. 5 shows an exemplary diagram for a UE cell search according to a third search pattern.

FIG. 5 shows an exemplary diagram 500 for a UE cell search according to a third search pattern. The diagram 500 is described with respect to four RATs, i.e., RAT-A, RAT-B, RAT-C and RAT-D, similar to the diagrams 300 and 400 described above, wherein RAT-A corresponds to NR, RAT-B corresponds to LTE, RAT-C corresponds to UMTS and RAT-D corresponds to GSM. However, a different number of RATs and/or a different order of priority may be used depending on UE implementation.

In 505, the UE performs a SICS on the available RATs in continuity based on the order of priority, similar to 305 and 405.

When no cell is accessed in 505, the UE proceeds to 510. In 510, the UE performs the first phase of the SBS (SBS1) for RAT-A, similar to 410. As discussed above, the UE searches bands on RAT-A where the band is known to be deployed or expected to be deployed in the current location by the PLMN being searched.

When no cell is accessed in 510, the UE continues to the remaining RATs to perform SBS1. That is, the UE proceeds to perform SBS1 for RAT-B (step 515), RAT-C (step 520) and RAT-D (step 525).

Each of the search patterns described above may be appropriate for use by the UE under different circumstances. For selecting a search pattern during a PLMN search, the following scenarios may be considered.

In one scenario, a limited service PLMN search is performed using the first search pattern. For this type of search, the priority for the UE is to find the service on any RAT for emergency or public warning system (PWS) purposes, e.g., earthquake and tsunami warning system (ETWS). Thus, the PLMN does not need to be prioritized.

In another scenario, a manual PLMN search is performed using the first search pattern. For this type of search, the priority for the UE is to detect PLMNs from better service-providing RATs, e.g., in the order of priority of NR to LTE to UMTS to GSM. Thus, the PLMN does not need to be prioritized.

In another scenario, an out-of-coverage (OOC) recovery PLMN search is performed using the second search pattern. For this type of search, the RRC for the respective RATs will benefit from mutual frequency exclusion (MFE), and the probability of important PLMNs to be found is higher in known bands. Thus, the PLMN is prioritized.

In all other scenarios not mentioned for a PLMN search, the default behavior for the UE is to use the second search pattern.

Some additional conditions may be required in order to use the second search pattern. In one example, the second search pattern may be used only when the UE is located in its home country and is not located close to a border. In another example, the second search pattern may be used only when the SICS frequency for the PLMN/RAT is available with xRRC. In still another example, the second search pattern may be used only when location-specific PLMN information data is available for the PLMN location.

For selecting a search pattern during cell selection, the following scenarios may be considered.

In one scenario, a cell selection is performed for an emergency call, a limited service scenario, or for emergency 911 camping using the first cell search pattern. For this type of search, the priority for the UE is to find the service on any RAT for emergency or public warning system (PWS) purposes, e.g., earthquake and tsunami warning system (ETWS), based on a call type preference. Thus, the PLMN does not need to be prioritized.

For the following scenarios, where the third search pattern is used, the following conditions may be required in order to use the third search pattern. In one example, the third search pattern may be used only when the UE is located in its home country and is not located close to a border. In another example, the third search pattern may be used only when the SICS frequency for the PLMN/RAT is available with xRRC. In still another example, the third search pattern may be used only when APACS data is available for the PLMN location. In still another example, the third search pattern may be used only when it is enabled.

In one scenario, an OOC recovery cell selection attempt is performed using the third search pattern. When the UE is located in its home country and not located close to a border, there is a very low probability that any other operator will be able to provide services. Thus, it is better to check for a registered PLMN (RPLMN) in other RATs prior to performing the PLMN search cycle.

In another scenario, a circuit switch fall back (CSFB) recovery cell selection attempt is performed using the third search pattern when reselection/redirection did not work. In this type of search, the UE is interested only in the home PLMN (HPLMN) in its home country.

In another scenario, an evolved packet system fallback (EPSFB) recovery cell selection attempt is performed using the third search pattern when reselection/redirection did not work. In this type of search, the UE is interested only in the RPLMN or equivalent PLMN (EPLMN) list.

In another scenario, a prioritized RAT to NR cell selection attempt is performed using the third search pattern. In this type of search, the UE is interested only the NR PLMN.

In another scenario, a network-based reject causes a cell selection to be performed using the third search pattern. In this type of search, the UE is interested only in the cell selection for that particular PLMN.

In another scenario, an N1/LTE mode disabling causes a cell selection to be performed using the third search pattern. In this type of search, the UE is interested only in the cell selection for that particular PLMN.

In all other scenarios not mentioned for a PLMN search, the default behavior for the UE is to use the second search pattern.

Figure 6:
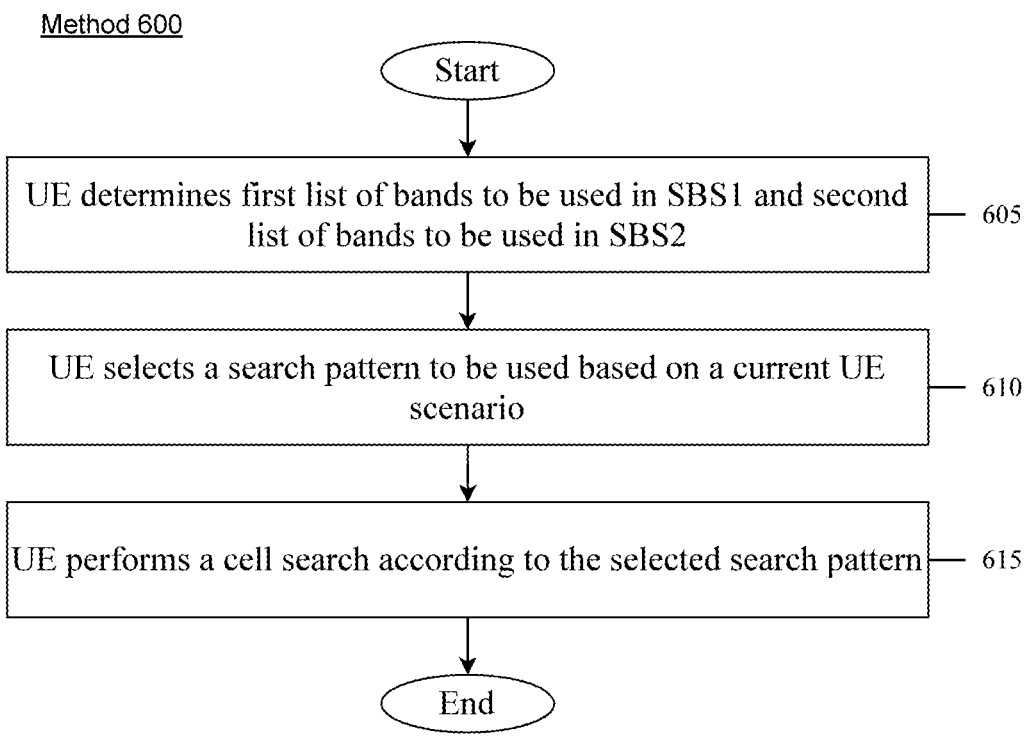
FIG. 6 shows a method for a UE cell search according to various exemplary embodiments described herein.

FIG. 6 shows a method 600 for a UE cell search according to various exemplary embodiments described herein.

In 605, the UE determines a first list of bands to be used in the first phase of the SBS and a second list of bands to be used in the second phase of the SBS. The UE may determine these lists based on deployment information for the PLMN of the UE.

In 610, the UE selects a search pattern to be used based on a current UE scenario and/or by evaluating current conditions, as explained above.

In 615, the UE performs the cell search according to the selected search pattern.

According to some aspects, the exemplary embodiments introduce techniques for descoped RAT and frequency band scanning avoidance. As mentioned above, the UE 110 may perform a cell search based on stored information. The stored information may include, but is not limited to, a list of predefined frequency bands per RAT and/or region and information identifying frequency bands of different RATs previously detected by the UE 110 per operator. As will be described in more detail below, a certain RAT or frequency band may be descoped by an operator. A scenario may occur where the stored information that may be used by the UE 110 to perform a cell search may include information for the descoped RAT or frequency band. This may have a negative effect on UE 110 performance and power consumption during a cell search.

An operator may abandon deployments of older RATs (e.g., UMTS, GSM, LTE, etc.). The frequency bands previously used by an abandoned RAT may remain empty or may be reused by a newer RAT (e.g., NR, LTE, etc.). For example, an operator may shut down the deployment of a certain RAT or all of the operators in a region (e.g., country, etc.) may no longer deploy a certain RAT. An operator may then deploy a newer RAT on the frequencies previously used by the descoped RAT. The process of deploying a RAT on frequency bands that were previously occupied by a different RAT may be referred to as "refarming." In addition, a scenario may occur where one or more bands of a RAT are descoped but the remaining bands of the RAT remain deployed.

Under conventional circumstances, after the operator changes the deployment of a RAT or frequency band, the stored information may trigger the UE 110 to scan one or more empty bands. However, this is a useless operation that may only increase the amount of time and power it takes for the UE 110 to scan frequencies during a cell search. Similarly, after the operator changes the deployment of a RAT or frequency band, the stored information may trigger the UE 110 to scan bands that have been refarmed without the stored information being updated to reflect the change. It has been identified that this may cause false positives during frequency scans which may only increase the amount of time and power it takes for the UE 110 to scan frequencies during a cell search.

The exemplary embodiments allow the UE to exclude descoped RATs and frequency bands that are no longer deployed from being considered during a frequency scan. When the UE 110 is aware that an operator in a certain country as turned off deployment of a certain RAT or does not use a specific band anymore in a certain RAT, the UE 110 may focus its search o more applicable band and RAT combinations instead of wasting time and power searching for potential cells on descoped RATs or bands that are no longer deployed by the operator.

According to some exemplary embodiments, the UE 110 may maintain one or more lists comprising descoped RATs, descoped bands per RAT, descoped bands per PLMN and/or descoped bands per region (e.g., country, localized region, mobile country code (MCC), etc.). From the perspective of the UE 110, the application processor may maintain the one or more lists. During power-on the one or more lists may be pushed to the baseband processor where it is stored for subsequent use.

To implement descoped RAT search avoidance, the UE 110 may consider the one or more lists during a cell search and/or PLMN search. For example, if any RAT is descoped for a particular PLMN, the UE 110 (e.g., non-access stratum (NAS)) may not trigger cell selection on the given RAT for PLMN selection. Similarly, based on the location based information from the application processor (e.g., AP assisted cell search (APACS), etc.), the UE 110 (e.g., NAS) avoid scanning descoped RATs in the given location as part of a PLMN search.

To implement descoped frequency band search avoidance, when the access stratum (AS) radio resource control (RRC) of the UE 110 receives an initial cell selection request to perform a frequency band scan for a specific PLMN or MCC, the AS RRC of the UE 110 may avoid performing a band scan that is descoped for a specific PLMN or MCC.

Figure 7A:
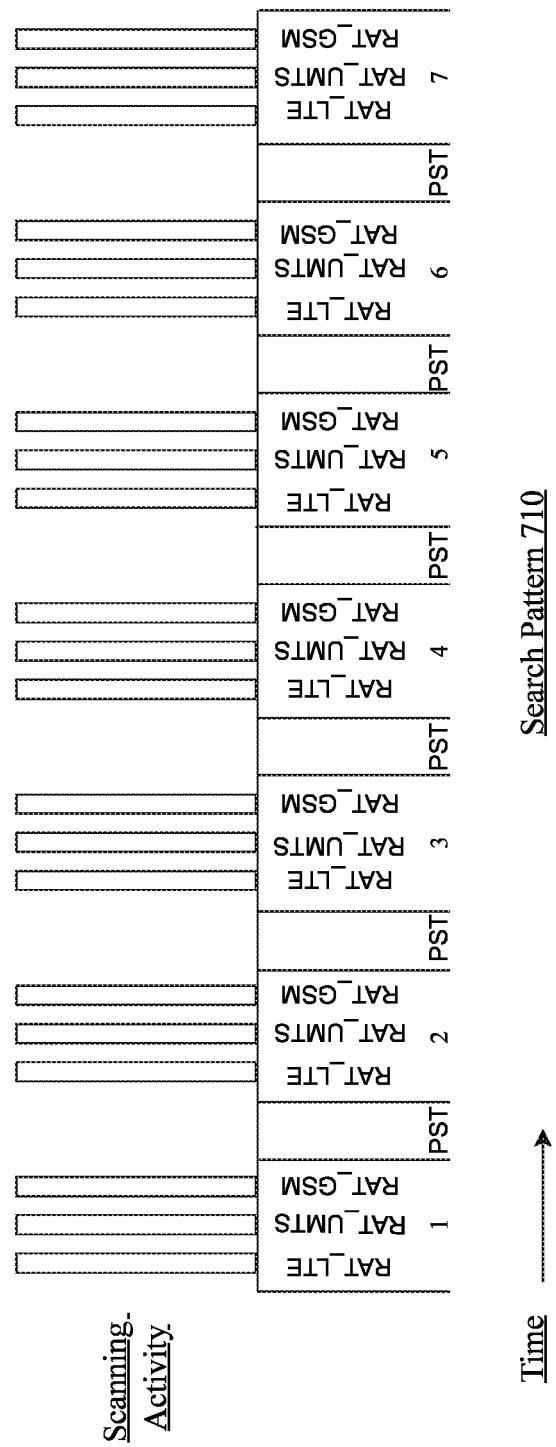
FIGS. 7a-7b show an example of avoiding a descoped radio access technology (RAT) during a cell search procedure according to various exemplary embodiments.

Under conventional circumstances, the UE 110 may trigger a SICS, a SBS and ABS on all enabled and supported RATs for PLMN search and selection. However, the UE 110 may not consider the presence of RAT/band deployment in a present location of UE 110 operation. An example of this is shown in FIG. 7a where the UE 110 search pattern 710 includes performing a search on an LTE RAT, a UMTS RAT and a GSM RAT. However, in this example, even though the UMTS RAT has been descoped at this location, the UE 110 still performs cell searches on the UMTS RAT.

Figure 7B:
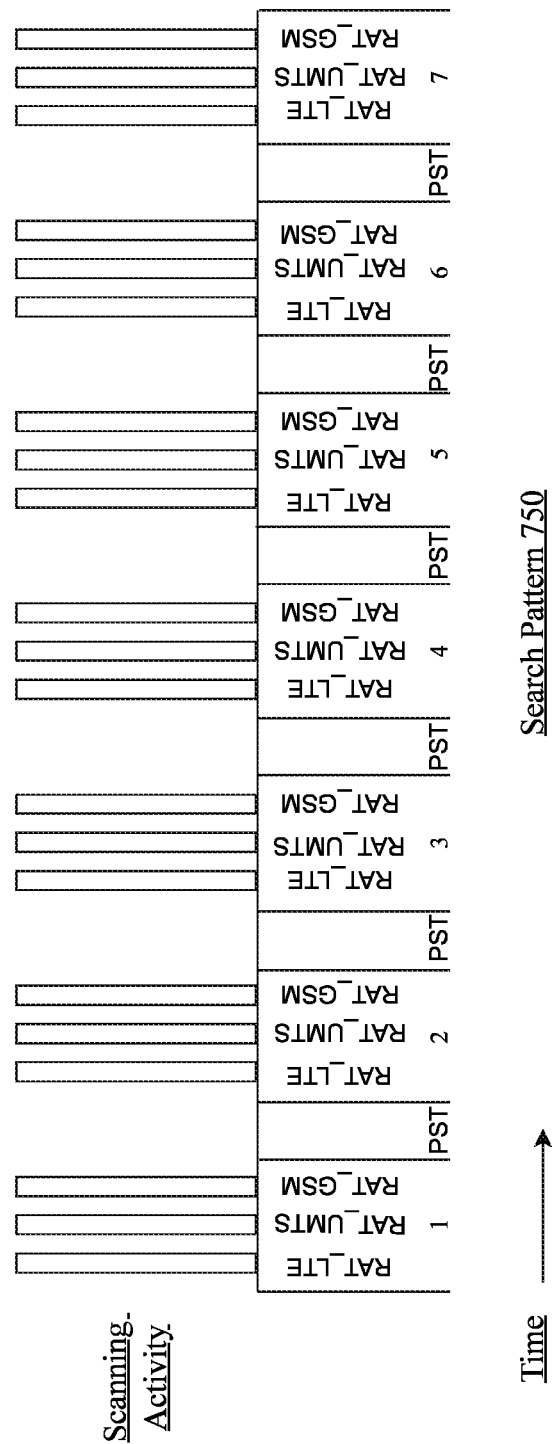

In accordance with the exemplary embodiments described herein, the UE 110 may avoid scanning descoped RATs. An example of this is shown in FIG. 7b where the UE 110 search pattern 750 includes performing a search on an LTE RAT and a GSM RAT at the same location within which the search pattern 710 was performed. In contrast to the search pattern 710, the UE 110 does not perform a search on the UMTS RAT since it has been descoped at this location. The exemplary embodiments may enable the UE 110 to conserve resources since the UE 110 does not spend time or battery power performing an unsuccessful cell search on descoped RAT.

FIG. 8 shows a method 800 for descoped RAT search avoidance according to various exemplary embodiments. The method 800 is described with regard to the network arrangement 100 of FIG. 1 and the UE 110 of FIG. 2.

In 805, the UE 110 initiates cell selection or PLMN search task preparation. For example, the UE 110 may be out of service and searching for a cell and/or PLMN on which to access network services. Thus, various components (e.g., NAS, AS, RRC, etc.) of the UE 110 may perform operations to prepare for cell selection and/or a PLMN search.

In 810, the UE 110 receives a descoped RAT list. For example, UE 110 may maintain a descoped RAT list per PLMN and/or a descoped RAT list per MCC in non-volatile memory. The NAS may extract the descoped RAT list from the application processor or the baseband processor of the UE 110. The information that provides the basis for the descoped RAT list may be derived at a remote server based on crowd sourced information. The server may provide the UE 110 with the descoped RAT information at any appropriate time and in any appropriate type of message.

In 815, the UE 110 determines a current RAT deployment based on stored information. For example, the NAS may get the current RAT deployment information from the application processor of the UE 110 for a particular PLMN or MCC based on a current location (e.g., APACS data) of the UE 110. At this time, the application processor may provide an updated descoped RAT list. If the application provides the updated list, the NAS updates the descoped RAT list with the list provided by the application processor.

In 820, the UE 110 prepares a RAT search list. In 825, the UE 110 determines whether a RAT from the current RAT deployment is present in the descoped RAT list. If the RAT is not present, the method 800 continues to 830 where the UE 110 adds the RAT to the RAT search list. Returning to 825, if the RAT is present in the descoped RAT search list, the method 800 continues to 835. In 835, the UE 110 does not add the RAT to the RAT search list since it is present in the descoped RAT list.

830 and 835 of the method 800 both continue to 840. In 840, the UE 110 determines whether the RAT search lists is complete. For example, the UE 110 may determine whether the RAT search list contains a maximum number of RATs. If the RAT search list contains less than the maximum number, the UE 110 may perform 825-835 for another RAT from the determined current RAT deployment in 815. In another example, the UE 110 may determine that RAT search list is complete because there are no more RATs from the determined current RAT deployment in 815 left to evaluate. Thus, if the RAT search list is not complete the method 800 returns to 825. If the one or more RAT search lists are complete, the method 800 continues to 845.

In 845, the UE 110 may perform a search on the one or more RATs from the RAT search list. For example, the NAS mobility management component of the UE 110 may attempt to perform out of service recovery on each RAT from the RAT search list. There may be a separate RAT search list for different types of scans (e.g., SICS, SBS, ABS, etc.) or a single RAT search list may be used for multiple different types of searches.

Figure 9:
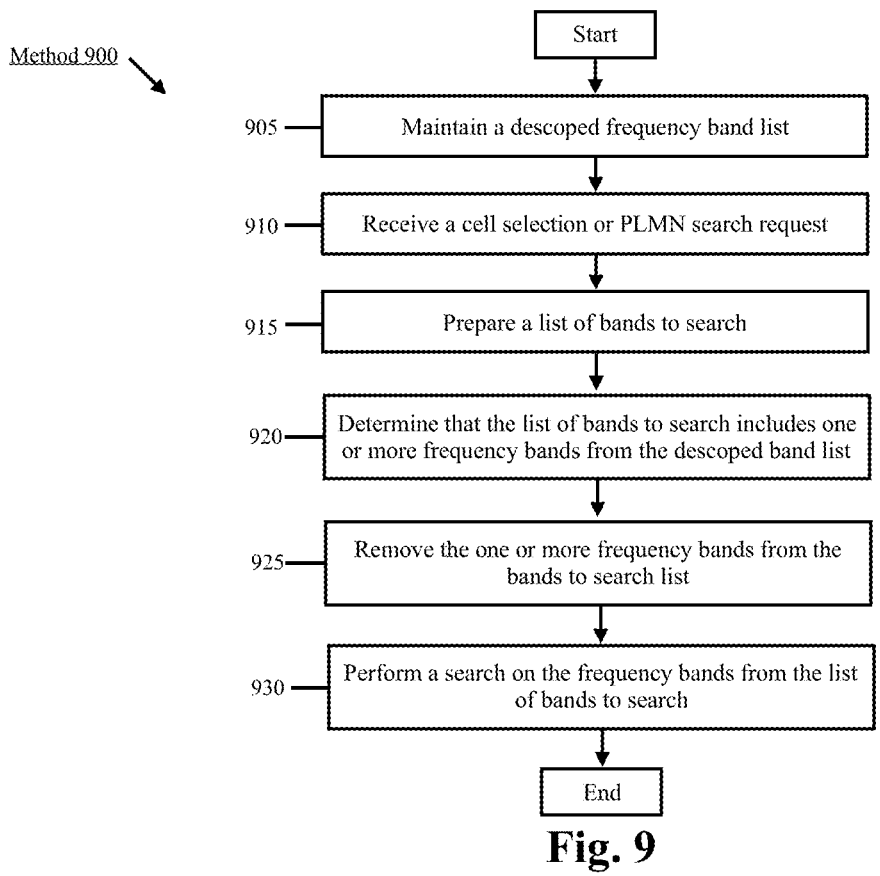
FIG. 9 shows a method for descoped band search avoidance according to various exemplary embodiments.

FIG. 9 shows a method 900 for descoped band search avoidance according to various exemplary embodiments. The method 900 is described with regard to the network arrangement 100 of FIG. 1 and the UE 110 of FIG. 2.

In 905, the UE 110 maintains a descoped frequency band list. The descoped frequency band list may be based on information received from the network, learned by the UE 110 while deployed or any other appropriate type of information. The information that provides the basis for the descoped frequency band list may be derived at a remote server based on crowd sourced information. The server may provide the UE 110 with the descoped frequency band information at any appropriate time and in any appropriate type of message.

In 910, the UE 110 receives a cell selection or PLMN search request. For example, the AS of the UE 110 may receive the request from the NAS of the UE 110. The request may be for a specific search type (e.g., SICS, SBS, ABS, etc.).

In 915, the UE 110 prepares a list of bands to search. The list may be based on stored information such as, but not limited to, a preconfigured list of frequency bands per RAT, per PLMN, per MCC and information identifying frequency bands previously detected by the UE.

In 920, the UE 110 determines that the list of bands includes one or more frequency bands from the descoped band list. In 925, the UE 110 removes the one or more bands from the list of bands to search. For example, the UE 110 may remove descoped frequency bands for the PLMN or MCC from the list of bands to search. In 930, the UE 110 performs a scan on the frequency bands from the list of bands to search.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a user equipment (UE) configured to perform operations comprising:
determining, for each radio access technology (RAT) of a plurality of RATs supported by the UE, a first list of bands on which a public land mobile network (PLMN) is expected to be deployed and a second list of bands including bands not included in the first list, wherein the first list of bands is determined based on a region where the UE is currently located and PLMN deployment information provided to the UE, wherein the second list of bands is determined based on the region where the UE is currently located;
selecting a cell search pattern for a cell search to be performed by the UE based on a current UE scenario;
performing a first phase of the cell search by scanning frequencies included in the first list of bands for a first priority RAT; and
when the first phase of the cell search is unsuccessful and no cell is selected, performing a second phase of the cell search by scanning frequencies included in the second list of bands for the first priority RAT, wherein the second phase of the cell search is determined based on the selected search pattern.

2. The processor of claim 1, wherein the UE selects a first search pattern, a second search pattern or a third search pattern.

3. The processor of claim 2, wherein the first search pattern comprises performing the first phase of the cell search on the first priority RAT followed by scanning frequencies included in the second list of bands for the first priority RAT before proceeding to scanning frequencies for the second priority RAT.

4. The processor of claim 3, wherein the second search pattern comprises performing the first phase of the cell search on the first priority RAT followed by scanning frequencies included in the first list of bands for the second priority RAT before proceeding to scanning frequencies included in the second list of bands for the first and second priority RATs.

5. The processor of claim 4, wherein the third search pattern comprises performing the first phase of the cell search on the first priority RAT followed by scanning frequencies included in the first list of bands for the second priority RAT and excluding scanning frequencies included in the second list of bands for the first and second priority RATs.

6. The processor of claim 5, wherein the first search pattern is used during a limited service PLMN search or a manual PLMN search.

7. The processor of claim 5, wherein the second search pattern is used during an out of coverage recovery PLMN search.

8. The processor of claim 5, wherein the third search pattern is used during an out of coverage recovery cell selection attempt, a circuit switch fallback recovery (CSFR) cell selection attempt, an evolved packet system fallback (EPSFB) recovery cell selection attempt, a prioritized RAT to NR cell selection attempt, a network-based reject caused cell selection attempt, and an N1/LTE mode disabling caused cell selection attempt.

9. The processor of claim 1, wherein the operations further comprise:
determining the first list of bands based on at least one of i) historical data determined by the UE regarding where the PLMN was previously found by the UE, ii) location-based PLMN deployment data, or iii) a static or dynamic network configuration.

10. The processor of claim 1, wherein the operations further comprise:
determining the second list of bands based on a static or dynamic network configuration.

11. A processor of a user equipment (UE) configured to perform operations comprising:
determining, for each radio access technology (RAT) of a plurality of RATs supported by the UE, a first list of bands on which a public land mobile network (PLMN) is expected to be deployed and a second list of bands including bands not included in the first list, wherein the first list of bands is determined based on a region where the UE is currently located and PLMN deployment information provided to the UE, wherein the second list of bands is determined based on the region where the UE is currently located;
selecting a cell search pattern for a cell search to be performed by the UE based on a current UE scenario;
performing a first phase of the cell search by scanning frequencies included in the first list of bands for a first priority RAT; and
when the first phase of the cell search is unsuccessful and no cell is selected, performing a second phase of the cell search by scanning frequencies included in the first list of bands for a second priority RAT, wherein the second phase of the cell search is determined based on the selected search pattern.

12. The processor of claim 11, wherein the UE selects a first search pattern, a second search pattern or a third search pattern.

13. The processor of claim 11, wherein the first search pattern comprises performing the first phase of the cell search on the first priority RAT followed by scanning frequencies included in the second list of bands for the first priority RAT before proceeding to scanning frequencies for the second priority RAT.

14. The processor of claim 13, wherein the second search pattern comprises performing the first phase of the cell search on the first priority RAT followed by scanning frequencies included in the first list of bands for the second priority RAT before proceeding to scanning frequencies included in the second list of bands for the first and second priority RATs.

15. The processor of claim 14, wherein the third search pattern comprises performing the first phase of the cell search on the first priority RAT followed by scanning frequencies included in the first list of bands for the second priority RAT and excluding scanning frequencies included in the second list of bands for the first and second priority RATs.

16. The processor of claim 15, wherein the first search pattern is used during a limited service PLMN search or a manual PLMN search.

17. The processor of claim 15, wherein the second search pattern is used during an out of coverage recovery PLMN search.

18. The processor of claim 15, wherein the third search pattern is used during an out of coverage recovery cell selection attempt, a circuit switch fallback recovery (CSFR) cell selection attempt, an evolved packet system fallback (EPSFB) recovery cell selection attempt, a prioritized RAT to NR cell selection attempt, a network-based reject caused cell selection attempt, and an N1/LTE mode disabling caused cell selection attempt.

19. The processor of claim 11, wherein the operations further comprise:
determining the first list of bands based on at least one of i) historical data determined by the UE regarding where the PLMN was previously found by the UE, ii) location-based PLMN deployment data, or iii) a static or dynamic network configuration.

20. The processor of claim 11, wherein the operations further comprise:
determining the second list of bands based on a static or dynamic network configuration.

* * * * *